US008520511B2

(12) United States Patent
Chmaytelli et al.

(10) Patent No.: US 8,520,511 B2
(45) Date of Patent: Aug. 27, 2013

(54) AUTOMATIC HANDLING OF INCOMING COMMUNICATIONS AT A WIRELESS DEVICE

(75) Inventors: Mazen Chmaytelli, San Diego, CA (US); Samir K. Khazaka, San Diego, CA (US); Bilhan Kirbas, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1002 days.

(21) Appl. No.: 10/661,926

(22) Filed: Sep. 11, 2003

(65) Prior Publication Data

US 2005/0058067 A1 Mar. 17, 2005

(51) Int. Cl.
*H04M 3/42* (2006.01)
*H04M 11/10* (2006.01)
*H04L 12/28* (2006.01)
*H04J 3/14* (2006.01)

(52) U.S. Cl.
USPC ............ 370/230; 370/228; 370/353; 370/356; 370/389; 370/392; 370/352; 379/201.1; 379/211.01; 379/266.02; 379/373.02; 379/211.02; 455/413; 455/420; 340/7.21; 340/7.31

(58) Field of Classification Search
USPC ...... 370/310.2, 228–503; 455/566, 413–503; 340/7.21–7.31; 379/201.1–373.02
See application file for complete search history.

(56) References Cited

U.S. PATENT DOCUMENTS

| | | | | |
|---|---|---|---|---|
| 5,006,983 A | * | 4/1991 | Wayne et al. | 705/7.13 |
| 5,153,902 A | * | 10/1992 | Buhl et al. | 455/432.1 |
| 5,276,729 A | * | 1/1994 | Higuchi et al. | 455/564 |
| 5,390,232 A | * | 2/1995 | Freeman et al. | 379/10.01 |
| 5,394,445 A | * | 2/1995 | Ball et al. | 379/88.21 |
| 5,559,860 A | * | 9/1996 | Mizikovsky | 455/413 |
| 5,822,416 A | * | 10/1998 | Goodacre et al. | 379/142.07 |
| 5,838,223 A | * | 11/1998 | Gallant et al. | 340/286.07 |
| 5,873,068 A | * | 2/1999 | Beaumont et al. | 705/14.53 |
| 5,887,251 A | * | 3/1999 | Fehnel | 455/411 |
| 5,983,117 A | * | 11/1999 | Sandler et al. | 455/557 |
| 6,049,718 A | * | 4/2000 | Stewart | 455/456.4 |
| 6,055,513 A | * | 4/2000 | Katz et al. | 705/26 |

(Continued)

FOREIGN PATENT DOCUMENTS

| | | |
|---|---|---|
| CN | 1275014 A | 11/2000 |
| CN | 1413004 A | 4/2003 |

(Continued)

OTHER PUBLICATIONS

International Search Report, PCT/US04/028061, International Searching Authority, European Patent Office, Oct. 26, 2007.

(Continued)

*Primary Examiner* — Ayaz Sheikh
*Assistant Examiner* — Venkatesh Haliyur
(74) *Attorney, Agent, or Firm* — James T. Hagler

(57) ABSTRACT

A wireless computer device, such as a mobile telephone, that receives attempted communication connections, such as phone calls, across a wireless network and can respond thereto without the user directly entering the communication. The wireless device classifies the attempted communication connection, such as through receipt of Caller ID, and performs a predetermined response to a communication connection attempt based upon the classification, such as blocking the call, answering with a prerecorded message, or sending data to the calling device.

30 Claims, 2 Drawing Sheets

(56) References Cited

U.S. PATENT DOCUMENTS

| | | | |
|---|---|---|---|
| 6,073,028 A * | 6/2000 | Humphrey et al. | 455/3.01 |
| 6,198,942 B1 * | 3/2001 | Hayashi et al. | 455/552.1 |
| 6,212,269 B1 * | 4/2001 | Yamanaka et al. | 379/230 |
| 6,304,906 B1 * | 10/2001 | Bhatti et al. | 709/227 |
| 6,363,412 B1 * | 3/2002 | Niwa et al. | 709/203 |
| 6,477,150 B1 * | 11/2002 | Maggenti et al. | 370/312 |
| 6,484,027 B1 * | 11/2002 | Mauney et al. | 455/421 |
| 6,502,213 B1 * | 12/2002 | Bowman-Amuah | 714/49 |
| 6,542,598 B2 * | 4/2003 | Fleischer et al. | 379/211.02 |
| 6,542,600 B1 * | 4/2003 | Munson et al. | 379/242 |
| 6,549,916 B1 * | 4/2003 | Sedlar | 1/1 |
| 6,597,785 B1 * | 7/2003 | Burke et al. | 379/355.08 |
| 6,614,781 B1 * | 9/2003 | Elliott et al. | 370/352 |
| 6,628,194 B1 * | 9/2003 | Hellebust et al. | 340/7.5 |
| 6,694,428 B2 * | 2/2004 | Lemke et al. | 713/1 |
| 6,696,921 B2 * | 2/2004 | Helferich | 340/7.21 |
| 6,754,335 B1 * | 6/2004 | Shaffer et al. | 379/266.02 |
| 6,782,240 B1 * | 8/2004 | Tabe | 455/66.1 |
| 6,895,237 B1 | 5/2005 | Scott | |
| 6,909,708 B1 * | 6/2005 | Krishnaswamy et al. | 370/352 |
| 6,961,420 B2 * | 11/2005 | DeSalvo | 379/355.02 |
| 7,003,327 B1 * | 2/2006 | Payne et al. | 455/566 |
| 7,022,905 B1 * | 4/2006 | Hinman et al. | 84/609 |
| 7,023,980 B2 * | 4/2006 | Lenard | 379/266.07 |
| 7,024,460 B2 * | 4/2006 | Koopmas et al. | 709/206 |
| 7,031,314 B2 * | 4/2006 | Craig et al. | 370/392 |
| 7,039,428 B1 * | 5/2006 | Helferich | 455/458 |
| 7,110,525 B1 * | 9/2006 | Heller et al. | 379/265.11 |
| 7,145,898 B1 * | 12/2006 | Elliott | 370/352 |
| 7,245,612 B2 * | 7/2007 | Petty et al. | 370/356 |
| 7,382,773 B2 * | 6/2008 | Schoeneberger et al. | 370/353 |
| 7,418,086 B2 * | 8/2008 | Sravanapudi et al. | 379/88.13 |
| 7,457,633 B2 * | 11/2008 | Scheinert et al. | 455/550.1 |
| 7,564,840 B2 * | 7/2009 | Elliott et al. | 370/356 |
| 7,634,528 B2 * | 12/2009 | Horvitz et al. | 709/200 |
| 7,975,056 B2 * | 7/2011 | Gmuender et al. | 709/228 |
| 8,094,647 B2 * | 1/2012 | Elliott et al. | 370/352 |
| 2002/0057678 A1 * | 5/2002 | Jiang et al. | 370/353 |
| 2002/0098831 A1 * | 7/2002 | Castell et al. | 455/413 |
| 2002/0128033 A1 * | 9/2002 | Burgess | 455/528 |
| 2002/0137503 A1 * | 9/2002 | Roderique | 455/420 |
| 2002/0176378 A1 * | 11/2002 | Hamilton et al. | 370/328 |
| 2003/0016632 A1 * | 1/2003 | Refai et al. | 370/260 |
| 2003/0028606 A1 * | 2/2003 | Koopmans et al. | 709/206 |
| 2003/0053448 A1 * | 3/2003 | Craig et al. | 370/353 |
| 2003/0063590 A1 * | 4/2003 | Mohan et al. | 370/338 |
| 2003/0091173 A1 * | 5/2003 | DeSalvo | 379/142.01 |
| 2003/0108015 A1 * | 6/2003 | Li | 370/338 |
| 2003/0108172 A1 * | 6/2003 | Petty et al. | 379/142.08 |
| 2003/0112931 A1 * | 6/2003 | Brown et al. | 379/93.23 |
| 2003/0112945 A1 * | 6/2003 | Brown et al. | 379/201.01 |
| 2003/0112948 A1 * | 6/2003 | Brown et al. | 379/207.04 |
| 2003/0112952 A1 * | 6/2003 | Brown et al. | 379/211.01 |
| 2003/0194074 A1 * | 10/2003 | Newlin | 379/211.01 |
| 2004/0055011 A1 * | 3/2004 | Bae et al. | 725/62 |
| 2004/0122895 A1 * | 6/2004 | Gourraud | 709/204 |
| 2004/0141508 A1 * | 7/2004 | Schoeneberger et al. | 370/401 |
| 2004/0198386 A1 * | 10/2004 | Dupray | 455/456.1 |
| 2004/0240640 A1 * | 12/2004 | Warner et al. | 379/88.18 |
| 2005/0058067 A1 * | 3/2005 | Chmaytelli et al. | 370/230 |
| 2008/0247529 A1 * | 10/2008 | Barton et al. | 379/211.01 |
| 2008/0249778 A1 * | 10/2008 | Barton et al. | 704/270 |

FOREIGN PATENT DOCUMENTS

| | | |
|---|---|---|
| JP | 8228236 | 9/1996 |
| JP | 9162980 A | 6/1997 |
| JP | 10164269 A | 6/1998 |
| JP | 10304044 A | 11/1998 |
| JP | 10304052 A | 11/1998 |
| JP | 2000059502 A | 2/2000 |
| JP | 2001144851 | 5/2001 |
| JP | 2003078609 A | 3/2003 |
| JP | 2004128857 A | 4/2004 |
| WO | WO0013401 A1 | 3/2000 |
| WO | WO0232095 A1 | 4/2002 |

OTHER PUBLICATIONS

Written Opinion, PCT/US04/028061, International Searching Authority, European Patent Office, Oct. 26, 2007.

International Preliminary Examination Report, PCT/US04/028061, International Preliminary Examining Authority, United States, Mar. 18, 2008.

Supplementary European Search Report—EP04782523—Search Authority—Munich—Nov. 22, 2011.

* cited by examiner

AUTOMATIC HANDLING OF INCOMING COMMUNICATIONS AT A WIRELESS DEVICE

BACKGROUND OF THE INVENTION

1. Field of the Invention

The present invention generally relates to communication between computer devices across wireless computer networks. More particularly, the invention relates to wireless devices having the ability to classify an incoming communication attempt, such as a phone call, and perform a predetermined action based upon the identification.

2. Description of the Related Art

In communication exchanges, such as voice and data telephone calls, it is desirous to know the identity of an incoming communication attempt for several reasons. Firstly, where the bridging of the communication connection, such as a connected telephone call, costs the device owner or subscriber money, the owner may not want to get charged for a specific incoming call. Secondly, the device owner may not want to waist time talking to the caller or receiving data from the caller because the caller is a solicitor, marketer, or some other person or entity the device owner does not wish to communicate with. Thus, several technologies have developed for land-line based telephone and telecommunication systems for a person to screen the incoming phone call.

In particular regard to telephone calling, it is known to transmit identifying data at the beginning a communication connection attempt so that the called device can identify the caller. One specific version of this identification is called "Caller ID" (CID), or Calling Number Delivery (CND). This system was created as an extension of Automatic Number Identification (ANI) which is used by telephone companies to identify the billing account for a toll call.

The CID information is transmitted on the telephone service subscriber loop using modem tones that transmit the identification display message in American Standard Code for Information Interchange (ASCII) character code form to the device receiving the phone call. The transmission of the display message typically takes place between the first and second "rings." The message consists of a channel seizure string followed by a mark string and then the caller information. The information is sent in one of two formats: "Single Data Message Format" (SDMF) which contains the date, time, and calling number; and the "Multiple Data Message Format" (MDMF) contains the date, time, calling number, and the name associated with that number. Optionally, the number and name fields may contain data indicating that the information has been blocked by the caller or is unavailable. Since the time CID was first made available, it has been expanded to offer CID on "call waiting," or where the call waiting tone is heard during an ongoing telephone conversation and the identification of the second incoming call is seen.

The need to identify incoming communication attempts is greater among wireless computer devices that have the ability to communicate voice and data to each other, such as cellular telephones. The subscriber or owner of the telephone is charged for all airtime used by the device so any incoming call answered costs the user.

Accordingly, it would be advantageous to provide a system for a wireless computer device, such as a cellular telephone, PDA, or other telecommunication device, to have a means to identify and/or classify an incoming communication attempt so that an undesired connection can be avoided with a predetermined response from the wireless device. Such system should be able to selectively handle the incoming communication without the need for user interaction to affect the response. It is thus to the provision of such a system and method that the present invention is primarily directed.

SUMMARY OF THE INVENTION

The present invention is a system and method at computer device having a wireless communication capability that receives attempted communication connections across a wireless network for classifying the attempted communication connections before they are necessarily answered, and performing a predetermined response to a communication connection attempt based upon the classification of the attempted communication connection. The predetermined response can be blocking the specific call, returning an audio or data response thereto, or requesting user input before allowing the communication attempt to connect to the device.

The method of responding to incoming communication connection attempts at the computer device include the steps of receiving an attempted communication connection across a wireless network, classifying the attempted communication connection; and performing a predetermined response to the attempted communication connection based upon the classification. The method can include the steps of blocking that specific communication, or all communications from that device or entity, or requesting user input prior to allowing the communication to connect.

It is therefore an object of the system and method provide a system in a wireless computer device, such as a cellular telephone, PDA, or other telecommunication device, to classify any incoming communication attempt so that an undesired connection is avoidable or otherwise handled with a predetermined response. The device can handle the incoming communication without the need for user interaction to affect the response, or can ask the user to determine the appropriate response when the connection attempt is received. Further, the wireless device can respond with either a voice response to a telephone caller, or a data response to either a caller or an incoming communication from a device.

Other objects, advantages, and features of the present invention will become apparent after review of the hereinafter set forth Brief Description of the Drawings, Detailed Description of the Invention, and the Claims.

DETAILED DESCRIPTION OF THE INVENTION

Figure 1:
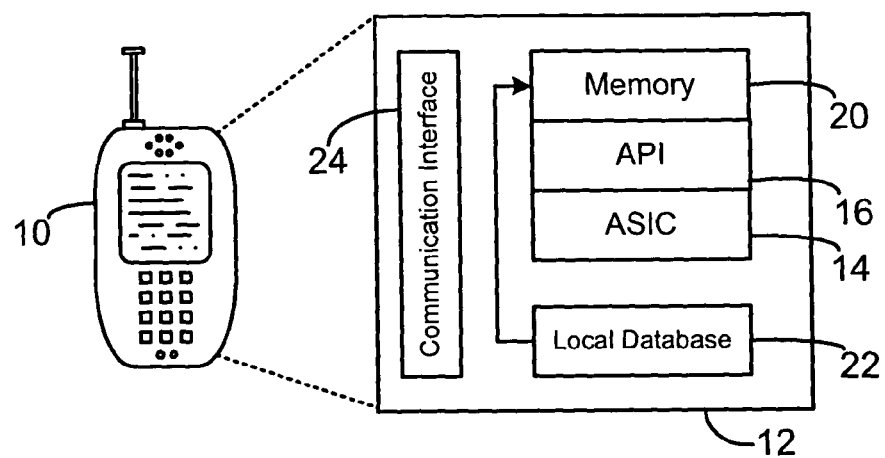
FIG. 1 is a block diagram of a computer architecture on a wireless device that has an incoming communication manager resident on the device platform.

With reference to the figures in which like numerals represent like elements throughout, FIG. 1 illustrates block diagram of a computer architecture on a wireless device including, such as cellular telephone 10, having wireless communication capability through a wireless communication interface 24. The wireless device 10 selectively receives attempted communication connections across a wireless network 25 (FIG. 2), such as a phone call, data call, SMS, or other communication attempt. The wireless device attempts to classify the attempted communication connections and perform a predetermined response to a communication connection attempt based upon the classification of the attempted communication connection.

More particularly, the wireless device 10 has a computer platform 12 that can receive and handle data sent from other computer telecommunication devices across the wireless network. The computer platform 12 includes, among other components, an application-specific integrated circuit ("ASIC") 14, or other processor, microprocessor, logic circuit, programmable gate array, or other data processing device. The ASIC 14 is installed at the time of manufacture of the wireless device and is not normally upgradeable. The ASIC 14 or other processor executes an application programming interface ("API") layer 16, which includes the resident application environment, and can include the operating system loaded on the ASIC 14. The resident application environment interfaces with any resident programs in the memory 20 of the wireless device. An example of a resident application environment is the "Binary Runtime Environment for Wireless" (BREW™) software developed by Qualcomm® for wireless device platforms.

As shown here, the wireless device can be a cellular telephone 10, with a graphics display, but can also be any wireless device with a computer platform as known in the art, such as a personal digital assistant (PDA), a pager with a graphics display, or even a separate computer platform that has a wireless communication portal, and may otherwise have a wired connection to a network or the Internet. Further, the memory 20 can be comprised of read-only or random-access memory (RAM and ROM), EPROM, EEPROM, flash cards, or any memory common to computer platforms. The computer platform 12 can also include a local database 22 for storage of software applications not actively used in memory 20, such as the software applications downloaded from a third party application download server. The local database 12 is typically comprised of one or more flash memory cells, but can be any secondary or tertiary storage device as known in the art, such as magnetic media, EPROM, EEPROM, optical media, tape, or soft or hard disk.

The wireless device, such as cellular telephone 10, has wireless communication capability through a wireless communication portal or communication interface 24 that selectively sends and receives data across a wireless network 25. The computer platform 12 resident application environment can communicate data to the platform 12 through the portal (interface 24), and can interact with any incoming communication stream and screen same for a predetermined response thereto. The predetermined response can be to block the incoming communication connection attempt so that a full communication is never bridged, such as a telephone call being unanswered. Alternately, the predetermined response can include an audio response to the incoming communication connection attempt, such as responding with a quick message like: "This number does not accept calls from unidentified numbers." And in one embodiment, the predetermined response can to request user input as to whether to accept the incoming communication or respond with a specific predetermined response. And in the case of a data call to the device, such as an SMS or e-mail, the predetermined response can be to return a data response to the incoming communication attempt, such as a responsive SMS or e-mail.

The classification of the incoming communication attempt is preferably by identifying the telephone number of a calling telephone making incoming communication attempt to the device, such as through the receipt of Caller ID for the incoming telephone call. And for a data communication, the classification occurs through the receipt of identity data within the incoming communication attempt, such as tag data received in initial frames of information.

Cellular telephones and telecommunication devices, such as cellular telephone 10, are being manufactured with increased computing capabilities and are becoming tantamount to personal computers and hand-held personal digital assistants ("PDAs"). These "smart" cellular telephones allow software developers to create software applications that are downloadable and executable on the processor, such as ASIC 14, of the cellular device 10. The wireless device, such as cellular telephone 10, can download and execute many types of applications, such as web pages, applets, MIDlets, games and stock monitors, or simply data such as news and sports-related data. The downloaded data or executable applications can be immediately displayed on a display of the device 10 or stored in the local database 22 when not in use. The software applications can be treated as a regular software application resident on the wireless device 10, and the user can selectively upload stored resident applications from the local database 22 to memory 20 for execution on the API 16, i.e. within the resident application environment. Accordingly, a program to screen in the incoming communication connections can be loaded on the platform 12 at the time of manufacture of the device, or the program can be downloaded to the platform 12 across the wireless network 25.

Figure 2:
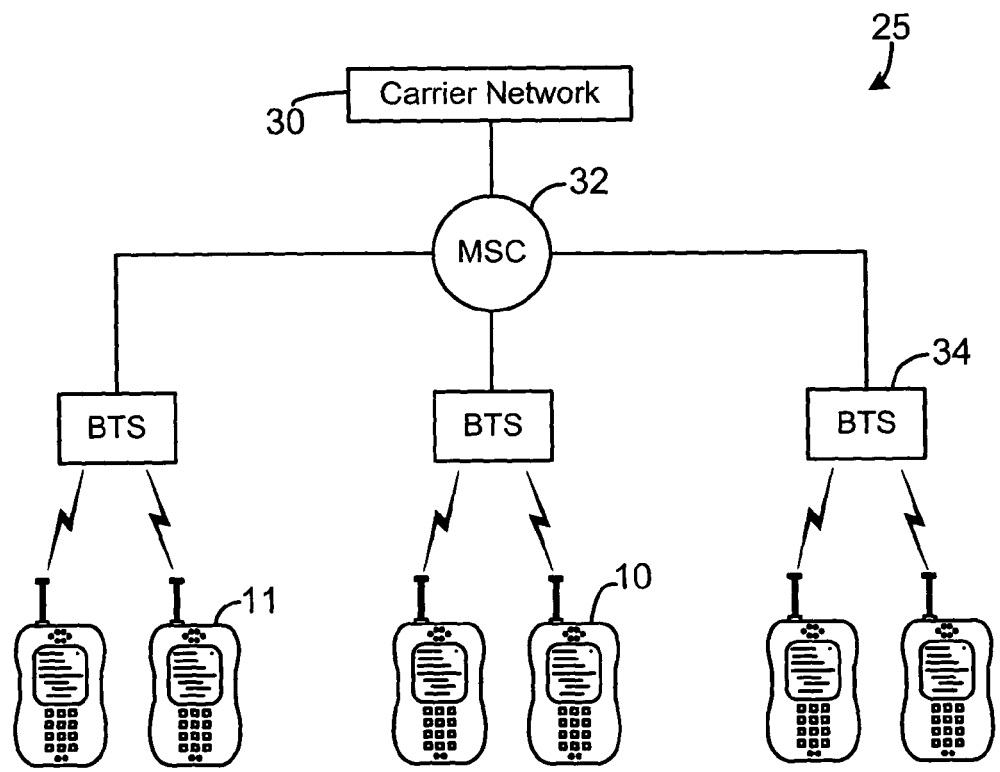
FIG. 2 is a representative diagram of one embodiment of a wireless network in a common cellular telecommunication configuration, having several computer devices that communicate with each other across the wireless network.

FIG. 2 is a block diagram that more fully illustrates the components of the wireless network 25 in which the wireless device 10 operates. The wireless network 25 is merely exemplary and can include any system whereby remote modules communicate over-the-air between and among each other and/or between and among components of a wireless network 25, including, without limitation, wireless network carriers and/or servers. The carrier network 30 controls messages (generally in the form of data packets) sent to a messaging service controller ("MSC") 32. The carrier network 30 communicates with the MSC 32 by a network, the Internet and/or POTS ("plain ordinary telephone system"). Typically, the network or Internet connection between the carrier network 30 and the MSC 32 transfers data, and the POTS transfers voice information. The MSC 32 is connected to multiple base stations ("BTS") 34. In a similar manner to the carrier network, the MSC 32 is typically connected to the BTS 34 by both the network and/or Internet for data transfer and POTS for voice information. The BTS 34 ultimately broadcasts messages wirelessly to the wireless devices, such as cellular telephone 10, by short messaging service ("SMS"), or other over-the-air methods known in the art.

Thus, on the wireless network 25, one wireless device 10 can place a voice or data communication attempt to another device, such as wireless device 11. Because the subscriber for the wireless service of device 10 can be charged for all airtime usage or messages sent, the subscriber may not want to receive telephone calls or messages from wireless device 11. The wireless device 10 can therefore have set as a predetermined response a block of any communication from device 11, or the subscriber can specify the predetermined response on the first receipt of the communication connection, as is shown below.

Figure 3:
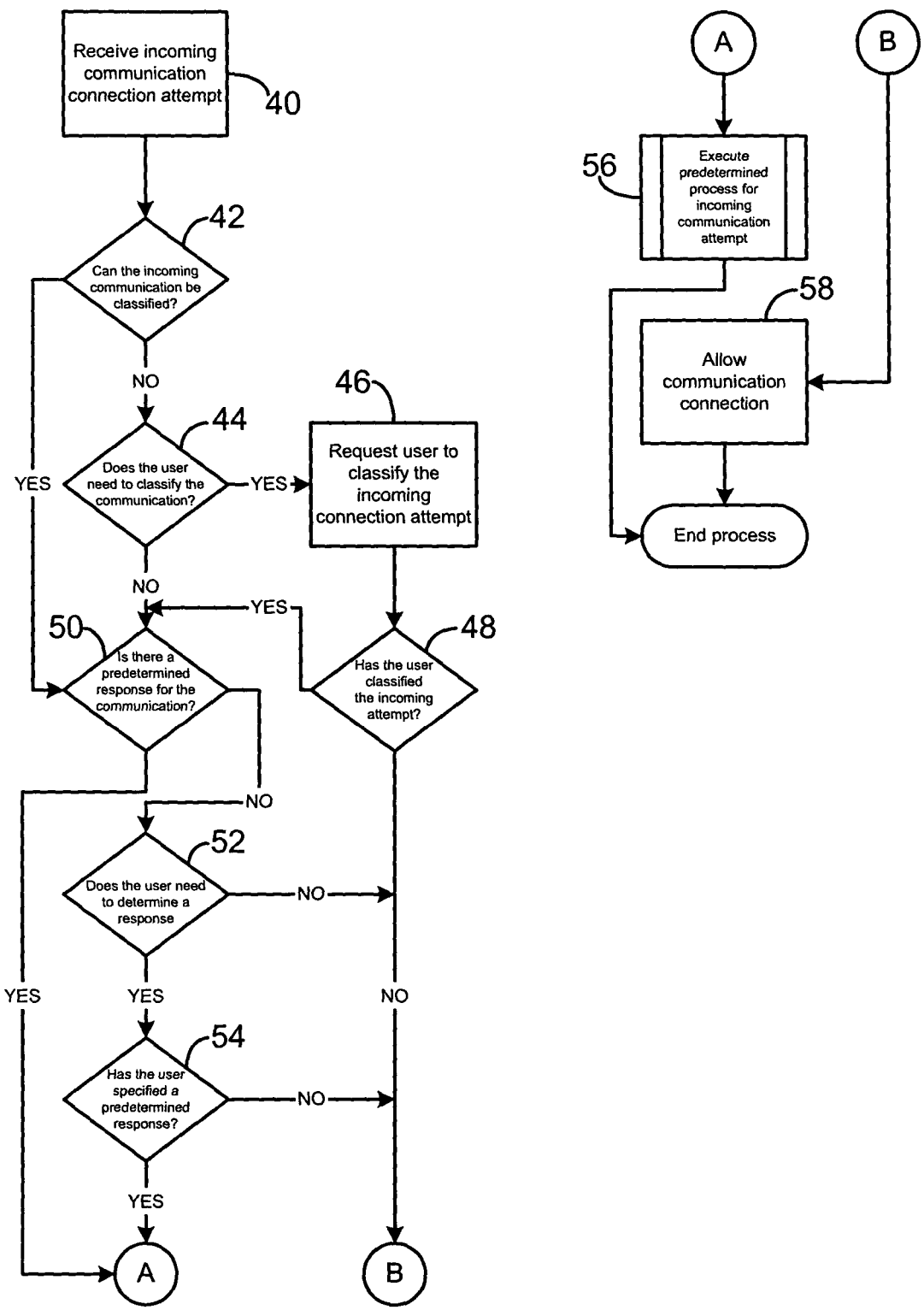
FIG. 3 is a flowchart of one embodiment of the process executing on a wireless device that receives an incoming communication connection attempt and either generates a predetermined automatic response, asks the device user to choose an appropriate response, or simply allows the connection.

FIG. 3 is a flowchart of one embodiment of the process executing on a wireless device 10 that receives an incoming communication connection. The device receives the communication connection attempt at step 40 and then makes a determination as to whether the incoming communication can be classified, as shown as decision 42, such as through detecting the presence of a Caller ID signal. If the incoming communication can be identified at decision 42, then the process forwards to make a determination as to whether there is a predetermined response to the incoming communication attempt, as shown at decision 50.

Otherwise, if the incoming communication attempt cannot be classified at decision 42, a determination is then made as to whether the user needs to classify the incoming communication, as shown at decision 44. In other words, the device may allow a certain type of call to pass to a default response, such as returning an audio message to the caller that the device does not accept unidentified callers. If the user does need to classify the incoming connection attempt as decision 44, the user is then requested to classify the incoming connection attempt, as shown at step 46, and then determination is made as to whether the user has classified the incoming attempt, as shown at decision 48. If the user classifies the incoming caller at decision 48, or if the user does not need to classify the incoming connection attempt at decision 44, a determination is then made as to whether there is a predetermined response for the incoming communication connection attempt, as shown at decision 50. Otherwise, if the user has not classified the incoming communication connection attempt at decision 48, then process then allows the communication to connection at shown at step 58 and then the process ends.

At decision 50, if there is a predetermined response to the incoming communication attempt, then the predetermined response is executed, as shown at predefined process 56, and then the process ends. Thus, it can be seen that the default condition is preferably to allow the communication to connect so that the user does not miss the communication. However, the default value can ultimately be set to refuse all unidentified or unclassified incoming communication connection attempts. If there is not a predetermined response specified for the incoming communication connection attempt at decision 50, then a determination is made as to whether the user needs to determine a response, as shown at decision 52. If the user does not need to determine a response at decision 52, then the incoming communication connection attempt is allowed, as shown at step 58, and then the process ends. If the user does need to determine a response to the incoming communication connection attempt at decision 52, then a determination is made as to whether the user has determined a response, as shown at decision 54.

If the user has not determined a response at decision 54, then the incoming communication connection attempt is allowed (or blocked depending upon the default) as shown at step 58, and then the process ends. Otherwise, if the user has determined a response to the incoming communication attempt at decision 54, then the chosen predetermined response is executed, as shown at predetermined process 56, and then the process ends. The predetermined response for that particular communication connection identity can be stored and reused for any future connection attempt to the device, or the response can be simply the response by the user for the call at that time, such as an audio response: "I'm unable to answer right now. Call back later."

It can thus be seen that as shown in FIG. 3, the wireless device 10 therefore provides a method of responding to incoming communication connection attempts at a computer device 10 having wireless communication capability including the steps of receiving an attempted communication connection across a wireless network 25, classifying the attempted communication connection (decision 42), and performing a predetermined response to the attempted communication connection based upon the classification (step 56). The step of performing a predetermined response can be to block the incoming communication connection attempt, generating an audio response to the incoming communication connection attempt, requesting user input as to whether to accept the incoming communication, or returning a data response to the incoming communication attempt.

The step of classifying the attempted communication connection can be through identifying the telephone number of a calling telephone making incoming communication attempt to the device, such as through the receipt of Caller ID from the attempted communication connection. Alternately, the step of classification can occur through the receipt of identity data within the incoming communication attempt, such as data in a frame. And if the incoming communication connection attempt is a data call, the step of performing a predetermined response can be sending data, such as an SMS message, to the device making the incoming communication attempt.

The method accordingly can be implemented by the execution of a program held computer readable medium, such as the memory 20 of the computer platform 12. The instructions can reside in various types of signal-bearing or data storage primary, secondary, or tertiary media. The media may comprise, for example, RAM (not shown) accessible by, or residing within, the wireless device. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A cellular telephone comprising:
   a processor;
   a wireless communication interface, coupled to said processor, wherein the wireless communication interface selectively receives an attempted incoming communication connection across a wireless network; and
   a memory coupled to said processor, wherein the processor is configured to:
   receive an attempted incoming communication connection;
   determine whether the attempted incoming communication can be classified based on whether identifying information of the attempted incoming communication connection is recognized;
   determine whether there is a default response associated with unclassified incoming communications when the identifying information is not recognized, wherein the default response establishes whether the unclassified communication will be able to establish a connection;
   perform the default response when it is determined that the identifying information is not recognized and that there is a default response associated with unclassified incoming communications;

request a user to input a classification for the attempted incoming communication and determine whether the user responded to the request when the identifying information is not recognized and no default response is associated with unclassified incoming communications, wherein upon determining that the user did not respond to the request, the incoming communication is allowed to connect;

classify the attempted incoming communication connection based upon the identifying information when the identifying information is recognized;

determine whether there is a predetermined response to the attempted incoming communication connection based upon the classification, wherein the predetermined response establishes whether the attempted incoming communication will be able to establish a connection and wherein the predetermined response comprises requesting user input as to whether to accept the attempted incoming communication connection, wherein:

upon determining that there is not a predetermined response based on the classification, the incoming communication is allowed to connect; and upon determining that there is a predetermined response based on the classification, the predetermined response is performed.

2. The cellular telephone of claim 1, wherein the predetermined response comprises blocking the attempted incoming communication connection.

3. The cellular telephone of claim 2, wherein the predetermined response comprises sending an audio response to the attempted incoming communication connection.

4. The cellular telephone of claim 1, wherein the predetermined response comprises returning a data response to the attempted incoming communication connection.

5. The cellular telephone of claim 1, wherein the classification of the attempted incoming communication connection occurs from identifying a telephone number of a calling telephone making the attempted incoming communication.

6. The cellular telephone of claim 5, wherein identifying a telephone number of a calling telephone comprises receiving Caller ID for the attempted incoming communication connection.

7. The cellular telephone of claim 1, wherein the classification occurs through receipt of identity data within the attempted incoming communication connection.

8. The cellular telephone of claim 4, wherein returning a data response to the attempted incoming communication connection comprises sending a short messaging service (SMS) message to a device making the attempted incoming communication connection.

9. A cellular telephone comprising:
means for selectively receiving an attempted incoming communication connection across a wireless network;
means for determining whether the attempted incoming communication can be classified based on whether identifying information of the attempted incoming communication connection is recognized;
means for determining whether there is a default response associated with unclassified incoming communications when the identifying information is not recognized, wherein the default response establishes whether the unclassified communication will be able to establish a connection;
means for performing the default response when it is determined that the identifying information is not recognized and that there is a default response associated with unclassified incoming communications;
means for requesting a user to classify the attempted incoming communication and determining whether the user responded to the request when the identifying information is not recognized and no default response is associated with unclassified incoming communications, wherein upon determining that the user did not respond to the request, the incoming communication is allowed to connect;
means for classifying the attempted incoming communication connection based upon the identifying information when the identifying information is recognized;
means for determining whether there is a predetermined response to the attempted incoming communication connection based upon the classification, wherein the predetermined response establishes whether the attempted incoming communication will be able to establish a connection and wherein the predetermined response comprises requesting user input as to whether to accept the attempted incoming communication connection;
means for performing the predetermined response to the attempted incoming communication in response to determining that there is a predetermined response based on the classification; and
means for allowing connection of the incoming communication in response to determining that there is not a predetermined response to the attempted incoming communication connection based on the classification.

10. A method for responding to incoming communication connection attempts at a cellular telephone comprising:
receiving an attempted incoming communication connection at the cellular telephone;
storing the attempted incoming communication in a memory of the cellular telephone;
determining in the cellular telephone whether the attempted incoming communication can be classified based on whether identifying information of the attempted incoming communication connection is recognized;
determining in the cellular telephone whether there is a default response associated with unclassified incoming communications when the identifying information is not recognized, wherein the default response establishes whether the unclassified communication will be able to establish a connection;
performing the default response when it is determined that the identifying information is not recognized and that there is a default response associated with unclassified incoming communications;
requesting a user to classify the attempted incoming communication and determining whether the user responded to the request when the identifying information is not recognized and no default response is associated with unclassified incoming communications,
wherein upon determining that the user did not respond to the request, the incoming communication is allowed to connect;
classifying the attempted incoming communication connection based upon the identifying information when the identifying information is recognized;
determining whether there is a predetermined response to the attempted incoming communication connection based upon the classification, wherein the predetermined response establishes whether the attempted incoming communication will be able to establish a connection and wherein the predetermined response comprises requesting user input as to whether to accept the attempted incoming communication connection, wherein:
upon determining that there is not a predetermined response based on the classification, the incoming communication is allowed to connect; and
upon determining that there is a predetermined response based on the classification, the predetermined response is performed.

11. The method of claim 10, wherein performing a predetermined response comprises blocking the attempted incoming communication connection.

12. The method of claim 11, wherein performing a predetermined response further comprises generating an audio response to the attempted incoming communication connection.

13. The method of claim 10, wherein returning a data response to the attempted incoming communication comprises returning a data response to the attempted incoming communication connection.

14. The method of claim 10, wherein classifying the attempted incoming communication connection comprises identifying a telephone number of a calling telephone making the attempted incoming communication connection to the cellular telephone.

15. The method of claim 14, wherein identifying a telephone number of a calling telephone comprises receiving Caller ID from the attempted incoming communication.

16. The method of claim 10, wherein classifying the attempted incoming communication connection occurs through the receipt of identity data within the attempted incoming communication connection.

17. The method of claim 13, wherein performing a predetermined response further comprises sending an short messaging service (SMS) message to a device making the attempted incoming communication connection.

18. A non-transitory computer-readable storage medium having stored thereon processor-executable instructions configured to cause a processor of a cellular telephone to perform operations comprising:
receiving an attempted incoming communication connection from another device across a wireless network;
determining whether the attempted incoming communication can be classified based on whether identifying information of the attempted incoming communication connection is recognized;
determining whether there is a default response associated with unclassified incoming communications when the identifying information is not recognized, wherein the default response establishes whether the unclassified communication will be able to establish a connection;
performing the default response when it is determined that the identifying information is not recognized and that there is a default response associated with unclassified incoming communications;
requesting a user to classify the attempted incoming communication and determining whether the user responded to the request when the identifying information is not recognized and no default response is associated with unclassified incoming communications,
wherein upon determining that the user did not respond to the request, the incoming communication is allowed to connect;
classifying the attempted incoming communication connection based upon the identifying information when the identifying information is recognized;
determining whether there is a predetermined response to the attempted incoming communication connection based upon the classification, wherein the predetermined response establishes whether the attempted incoming communication will be able to establish a connection and wherein the predetermined response comprises requesting user input as to whether to accept the attempted incoming communication connection, wherein:
upon determining that there is not a predetermined response based on the classification, the incoming connection is allowed to connect; and
upon determining that there is a predetermined response based on the classification, the predetermined response is performed.

19. The non-transitory computer-readable storage medium of claim 18, wherein the processor-executable instructions cause a processor of a cellular telephone to perform operations such that performing a predetermined response comprises blocking the attempted incoming communication connection.

20. The non-transitory computer-readable storage medium of claim 19, wherein the processor-executable instructions cause a processor of a cellular telephone to perform operations such that performing a predetermined response further comprises generating an audio response to the attempted incoming communication connection.

21. The non-transitory computer-readable storage medium of claim 18, wherein the processor-executable instructions cause a processor of a cellular telephone to perform operations such that performing a predetermined response comprises returning a data response to the attempted incoming communication connection.

22. The non-transitory computer-readable storage medium of claim 18, wherein the processor-executable instructions cause a processor of a cellular telephone to perform operations such that classifying the attempted incoming communication connection comprises identifying the telephone number of a calling telephone making the attempted incoming communication connection.

23. The non-transitory computer-readable storage medium of claim 22, wherein the processor-executable instructions cause a processor of a cellular telephone to perform operations such identifying the telephone number of a calling telephone comprises receiving Caller ID from the attempted incoming communication connection.

24. The non-transitory computer-readable storage medium of claim 18, wherein the processor-executable instructions cause a processor of a cellular telephone to perform operations such that classifying the attempted incoming communication connection occurs through the receipt of Caller ID from the attempted incoming communication connection.

25. The non-transitory computer-readable storage medium of claim 21, wherein the processor-executable instructions cause a processor of a cellular telephone to perform operations such that returning a data response to the attempted incoming communication connection comprises sending an SMS message to the device making the attempted incoming communication connection.

26. The cellular telephone of claim 1, wherein the default response is an audio message configured for unidentified calling parties.

27. The cellular telephone of claim 1, wherein the default response comprises allowing connection of the attempted incoming communication.

28. The cellular telephone of claim 9, wherein the default response comprises allowing connection of the attempted incoming communication.

29. The method of claim 10, wherein the default response comprises allowing connection of the attempted incoming communication.

30. The non-transitory computer-readable storage medium of claim 18, having stored thereon further processor-executable instructions that cause a processor of a cellular telephone to perform operations such that the default response comprises allowing connection of the attempted incoming communication.

\* \* \* \* \*